UNITED STATES PATENT OFFICE.

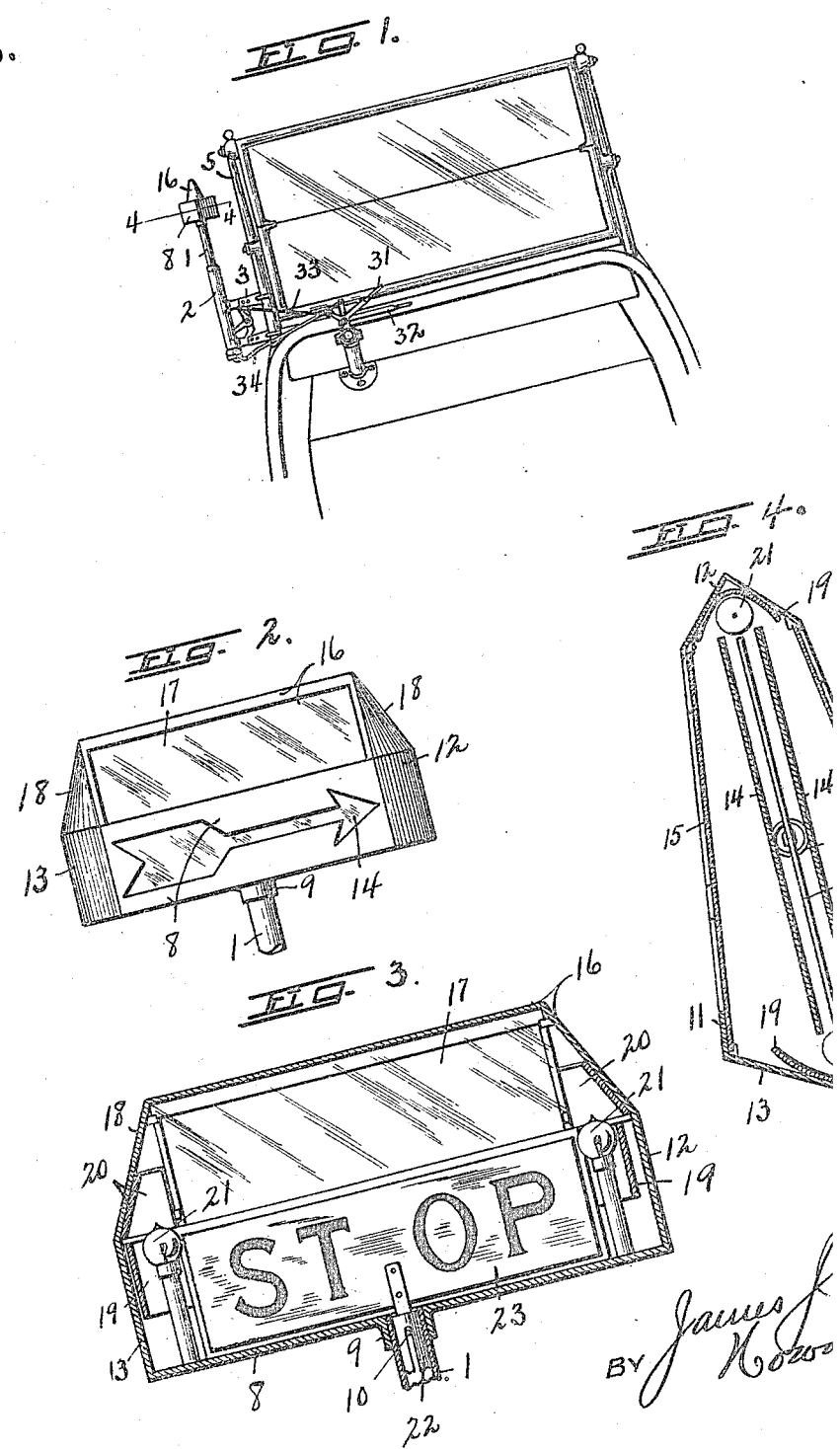

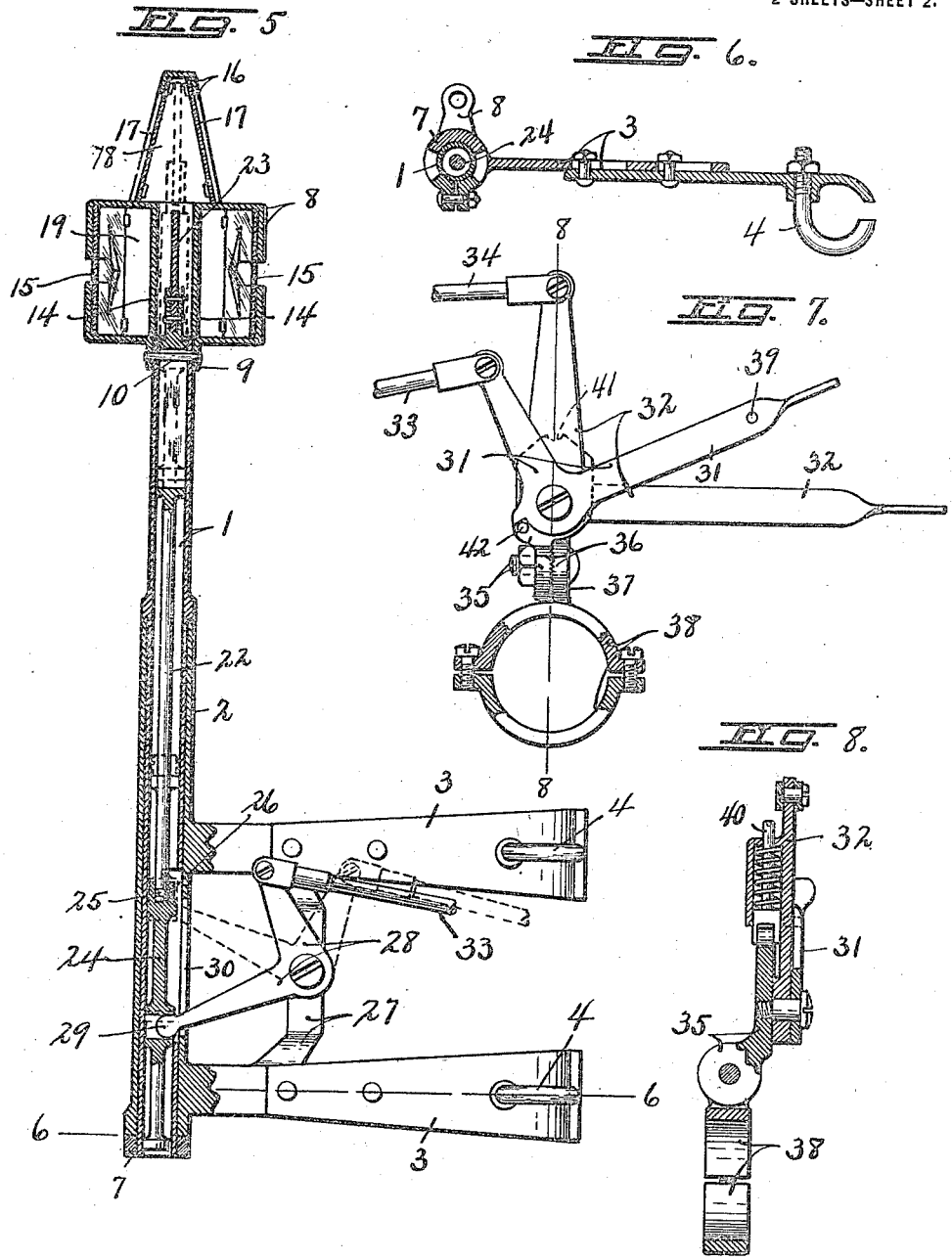

JAMES JOSEPH CARR, OF AUBURN, NEW YORK.

VEHICLE-SIGNAL.

1,255,856. Specification of Letters Patent. Patented Feb. 12, 1918.

Application filed June 23, 1917. Serial No. 176,548.

*To all whom it may concern:*

Be it known that I, JAMES J. CARR, a citizen of the United States of America, and resident of Auburn, in the county of Cayuga, in the State of New York, have invented new and useful Improvements in Vehicle-Signals, of which the following, taken in connection with the accompanying drawings, is a full, clear, and exact description.

This invention relates to certain improvements in vehicle signals, particularly designed for attachment to and use on automobiles and the like.

The primary object of the invention is to provide a mechanically-actuated signal for automobiles and similar vehicles operable to indicate the direction the vehicle is about to take, or the fact that the vehicle is about to stop.

Other objects and advantages relate to the details of construction and operation of the device by which the primary object is attained in a highly efficient and perhaps preferred manner.

In the drawings—

Figure 1 is an elevation of a portion of an automobile illustrating my invention in signals as attached to the wind-shield support.

Fig. 2 is a side elevation of the signal box.

Fig. 3 is a longitudinal vertical section of the box shown in Fig. 2.

Fig. 4 is a section on line 4—4, Fig. 1.

Fig. 5 is an elevation largely in section of the signal mechanism.

Fig. 6 is a cross section on line 6—6, Fig. 5.

Fig. 7 is a plan view of the levers for operating the signal-indicating means for attaching the same to a portion of the vehicle, as the steering post.

Fig. 8 is a cross section on line 8—8, Fig. 7.

The invention, as shown, comprises an upright tube —1— of suitable material, such as metal, movable in and surrounded by a reinforcing sleeve —2— which sleeve carries suitable brackets —3— provided with clamping means —4— for securing a mechanism to a vehicle, as shown, to the post —5— forming a portion of the windshield supporting means.

The tube —1— is preferably provided with a radial enlargement or flange —6— limiting the movement of the tube downwardly through the sleeve and beneath the lower end of the sleeve —2—. The tube is rigidly connected to a clamp —7— formed with a lever arm for rotating the tube within the sleeve as hereinafter described.

The signal box —8— is rigidly connected to and supported by the tube —1— and may, as shown, be formed with a depending nipple —9— telescoping externally with the sleeve and connected thereto by bolt —10—.

The signal box, as best shown in Fig. 4, has its opposite longitudinal walls —11— converging toward one end and connected at opposite ends by end walls —12— and —13—, preferably as shown of angular conformation and converging outwardly from the side walls —11—.

The box is formed with a pair of partitions —14— having their outer sides preferably colored, painted or lacquered so as to readily appear through arrow-shape openings —15— formed in the opposite side walls —11— of the box —8—.

Preferably these arrow-shape openings are covered or closed by plates of transparent material —15— which may be celluloid, glass or the like.

Disposed above the box —8— is a superstructure —16—, preferably having its walls converging upwardly and its opposite side walls formed of transparent plates —17— of glass, celluloid or the like.

The end walls —18— of the superstructure, as well as the side walls, preferably taper upwardly to form at the top a structure of a length substantially equal to the length of the side walls —11—.

Within the box and preferably secured to the end walls —12— and —13— of the box and the end walls —18— of the superstructure are secured reflecting members —19— and —20—.

The reflectors —19—, as shown, secured to the end walls —12— and —13— and the reflectors —20— secured to the end walls —18— are also shaped and arranged as to reflect the light from suitable lighting means, as the electric lamps —21—, shown, upon the outer sides of the partitions —14— and —15— so that these surfaces will distinctly appear and identify the arrow-shaped openings in the side walls —11—.

By turning the tube —1— by means of lever —7—, the box —8— is likewise turned to disclose an indicating means pointing in the direction that the vehicle is to travel.

Within the tube —1— is arranged a rod or shaft —22— carrying at its upper end a plate —23— having written, printed or otherwise formed thereon means indicating that the vehicle is about to stop. Preferably this indicating means is the word "Stop".

The shaft —22— is rotatably connected at its lower end to an elevating rod —24—, the rod being formed with a seat within which the end of the shaft is positioned, the ends of the shaft being formed with a circumferential groove —25— for receiving a set screw —26—.

A cross bar —27— may, as shown, be secured to the bracket —3— for carrying bell-crank —28—, one end of which loosely engages the elevating rod —24— and preferably the elevating rod is formed with a tubular hub within which a spherical portion —29— upon one end of the bell-crank is positioned, the sleeve —2— being formed with a slot —30— to permit vertical movement of the bell-crank.

By the operation of the bell-crank, the elevating rod —24— and shaft —22— are elevated so as to raise the plate —23— to the position shown in dotted lines, Fig. 5, so that the word "Stop" is displayed through the transparent plate —17— of the superstructure.

Lever means, preferably positioned adjacent the driver of the vehicle, is provided for operating bell-crank —28— and lever —8— at will. Such means may, as shown in Figs. 7 and 8, comprise a pair of bell-cranks —31— and —32—, the bell-crank —31— connected to the bell-crank —28— by means of link —33— and the bell-crank —32— connected to lever arm —8— by link— 34—.

By movement of these levers, the operator may indicate any desired direction of travel of the vehicle, both to those in the rear and at the front of the vehicle, or may indicate that the vehicle is about to stop.

Preferably the bell-cranks —31— and —32— are pivoted upon one section —35— of a saw-tooth clutch —36—, the other member —37— of which is secured to a clamp —38— for attachment to the steering post or other suitable part of the vehicle.

Preferably the bell-crank —31— is provided with a pin —39— moving in the path of the bell-crank —32— so that when the first-named bell-crank is operated to elevate the stop signal, the box —8— will likewise be turned to point in a direction to the right of the vehicle.

The bell-crank —32— is normally held in any one of its three desired positions by any spring-pressed pawl —40— engaging in a recess —41— formed at the apex portion of the element —13—, or when moved from said recess the spring-pressed pawl will automatically tend to turn the signal to indicate the desired direction by movement of the pawl down the inclined surfaces shown in dotted lines Fig. 7.

A suitable stop —42— is provided in connection with element —35— for limiting the movement of bell-crank —31—.

From the above description, the operation of the device will be readily understood.

Although I have shown and described a particular construction, form and arrangement of parts as perhaps constituting a preferred embodiment of my invention, I do not desire to limit myself to the same as many changes may be made in the details of form, construction, arrangement and means of operation without departing from the spirit of this invention as set forth in the appended claims.

What I claim is:

1. A signal comprising a direction-indicating means, a tube upon which said means is mounted, mechanism for rotating the tube to rotate the direction-indicating means, a shaft within the tube, a stop-indicating means carried by the shaft, and means for elevating the shaft.

2. A signal comprising a signal casing having openings through opposite walls thereof, spaced partitions within the casing, a tube carrying the casing, means for rotating the tube, a shaft within the tube, a stop-indicating means carried by the shaft, and mechanism for elevating the shaft.

3. A signal comprising a casing having an opening through a wall thereof, spaced partitions within the casing, a superstructure rising from the casing, a tube carrying the casing, mechanism for rotating the tube, a shaft within the tube, stop-indicating means carried by the shaft normally positioned between said partitions, and means for elevating the stop-indicating means to raise the same from between said partitions and into said superstructure.

4. A signal comprising a casing having an opening through a wall thereof, spaced partitions within the casing, a superstructure rising from the casing, a tube carrying the casing, mechanism for rotating the tube, a shaft within the tube, stop-indicating means carried by the shaft normally positioned between said partitions, means for elevating the stop-indicating means to raise the same from between said partitions and into said superstructure, lighting means within the casing, and means for reflecting the lighting means on to said partitions.

In witness whereof I have hereunto set my hand this 19th day of June, 1917.

JAMES JOSEPH CARR.

Witnesses:
JAMES E. ELDER,
HARRY O. KIMBALL.